United States Patent [19]

Bradshaw et al.

[11] 4,117,172

[45] Sep. 26, 1978

[54] PROCESS FOR PREPARING SIMULATED SOFT CENTERED FRUITS

[75] Inventors: Noel James Bradshaw, Sharnbrook; David Savage, Folkestone; Michael Edwin Sneath, Wellingborough, all of England

[73] Assignee: Lever Brothers Company, New York, N.Y.

[21] Appl. No.: 684,328

[22] Filed: May 7, 1976

Related U.S. Application Data

[60] Continuation of Ser. No. 523,181, Nov. 12, 1974, abandoned, which is a division of Ser. No. 335,994, Feb. 26, 1973, abandoned.

[30] Foreign Application Priority Data

Mar. 1, 1972 [GB] United Kingdom ................ 9528/72

[51] Int. Cl.$^2$ ................................................ A23L 1/04
[52] U.S. Cl. .................................... 426/276; 426/573; 426/577; 426/516; 426/803
[58] Field of Search ............... 426/803, 102, 104, 516, 426/577, 573, 276, 575, 321, 330, 422, 520

[56] References Cited

U.S. PATENT DOCUMENTS

| | | | |
|---|---|---|---|
| 2,403,547 | 7/1946 | Peschardt | 426/104 |
| 2,524,416 | 10/1950 | Baker | 426/577 |
| 2,919,198 | 12/1959 | Kohler | 426/575 |
| 2,992,925 | 7/1961 | Green | 426/102 |
| 3,362,831 | 1/1968 | Szezesniak | 426/104 |
| 3,493,394 | 2/1970 | Eldridge et al. | 426/577 |
| 3,682,654 | 8/1972 | Johnson | 426/577 |

FOREIGN PATENT DOCUMENTS

| | | | |
|---|---|---|---|
| 4,623,031 | 7/1971 | Japan. | |
| 4,511,101 | 4/1970 | Japan. | |
| 586,157 | 12/1944 | United Kingdom. | |
| 708,992 | 5/1954 | United Kingdom | 426/803 |

*Primary Examiner*—S. Leon Bashore
*Assistant Examiner*—Steve Alvo
*Attorney, Agent, or Firm*—James J. Farrell; Michael J. Kelly; Melvin H. Kurtz

[57] ABSTRACT

A fruit product having a texture which on eating is sensed as non-uniform like that of soft centered fruits such as gooseberries and cherries is prepared by a process in which fruit pulp or puree admixed with an alginate or pectate sol is brought into contact with a dissolved calcium ion so that part of the sol is gelled and the fruit pulp or puree is distributed between a fluid or plastic core of alginate or pectate sol and a firm exterior of calcium alginate or pectate gel and the product is heated to prevent the core from becoming a firm gel.

20 Claims, No Drawings

PROCESS FOR PREPARING SIMULATED SOFT CENTERED FRUITS

This a continuation of application Ser. No. 523,181, filed Nov. 12, 1974, now abandoned; which is a division, of application Ser. No. 335,994, filed Feb. 26, 1973, now abandoned.

This invention relates to fruit products and provides products having a texture which on eating is sensed as non-uniform, like that of soft centered fruits such as gooseberries and cherries.

According to the invention such a product comprises fruit pulp or puree distributed between a fluid or plastic core and a firm exterior of calcium alginate or pectate gel. The fluid or plastic core may be an ungelled alginate or pectate sol or may be a calcium alginate or pectate gel which is plastic, that is deformable, relative to the firm exterior.

According to a preferred method of making the products of the invention fruit pulp or puree admixed with an alginate or pectate sol is brought into contact with dissolved calcium ions so that part of the sol is gelled and the fruit pulp or puree is distributed between a fluid or plastic core of alginate or pectate sol and a firm exterior of calcium alginate or pectate gel; and the product is heated to prevent the core from becoming a firm gel. If it is not heated the calcium ions which diffuse inwardly to the core from the exterior of calcium alginate or pectate gel cause gelation of the core and progressive hardening of it.

The dissolved calcium ions with which the sol and fruit material are brought into contact are preferably provided by a solution of the calcium salt of an edible organic acid for example lactic, malic, citric or fumaric acid. Alternatively a solution of calcium chloride can be used. The concentration of dissolved calcium salt is suitably in the range 0.5 – 20% by weight.

An edible organic acid such as citric, lactic, malic or fumaric acid can be included in the calcium salt solution to give a desirable tartness to the fruit product. Preferably the sol admixed with the fruit material is extruded below the surface of the calcium salt solution and the extrudate is cut into portions while suspended in the solution. (A suitable apparatus for extrusion in this fashion is described in British Patent Specification No. 727,475.) By this procedure rounded pieces similar in shape to gooseberries or cherries can be obtained.

Heating of the product to prevent firm gelling of the core is suitably at a temperature of 70° – 100° C. and in the case of alginates is preferably at 85° C. or above for at least two minutes. By this procedure pasteurization is achieved simultaneously.

Heating is preferably carried out after the product has been withdrawn from contact with the dissolved calcium ions. The product is preferably held in the calcium salt solution for 10 – 30 minutes dependent on the thickness of skin desired and is then heated within one hour preferably within 30 minutes of its removal from the solution. Where the product is to be canned in a syrup or filled into pies in a viscous matrix it is conveniently heated in the syrup or matrix. The syrup or matrix in this case preferably contains a small amount for example up to 0.5% of a calcium salt such as dicalcium phosphate. We have found that this prevents rupture of the firm exterior of the product which otherwise occurs in a small proportion of the simulated berries.

The invention is particularly suitable in simulating gooseberries, grapes, cherries and blackcurrants which have a firm exterior around a relatively fluid core. However artificial fruits having a pleasing texture can also be formed from pulps of apple or pear or apricots although with these the texture formed will not correspond to that of the natural fruit.

Fruit pulp or puree to be used in making fruit products according to the invention can be obtained by any procedure which while destroying the structure of the fruit as such so as to release from the fruit structure the juice which it encloses nevertheless stops well short of destroying all the structural elements of the fruit. The fruit pulp or puree contains a proportion of edible insoluble material which contributes to the eating texture of the simulated fruit formed. The pulp of puree suitably forms 25% or more by weight of the mixture of the fruit material and sol when pulped or pureed whole fruit is used; a somewhat lower level of fruit materials may be used if it has a high content of insoluble solids such as the pulp remaining after pressing out of fruit juice. When the lower levels of fruit material are used, flavouring and colouring agents are preferably also incorporated in the sol.

The sol used in carrying out the invention is preferably based on sodium alginate. Alginates having a high content of mannuronic acid residues (mannuronic:guluronic ratio greater than 1:1 and preferably about 1.5 – 3:1) are preferred when a very marked difference between the textures of core and exterior (as with gooseberries) is desired. In this case the core may be more fluid than the initial mixture of fruit pulp or puree and alginate sol. Alginates having a high content of guluronic acid residues (mannuronic:guluronic ratio less than 1:1 and preferably about 0.4 – 0.6:1) are preferred when a core which is plastic but not liquid is desired (as with cherries). In this case the core may become sufficiently gelled that the product can be cut without the core spilling out although the core can be squeezed out from the firm exterior. The proportion of alginate in the product is suitably from 0.5 – 3% by weight. A pectate can be used instead of an alginate; however we have found that the texture of the exterior after heating is not so firm when a pectate is used.

Other ingredients can be included in the product, for example freeze-thaw stabilising agents such as cooked starches and cellulose ethers, thickeners such as modified starches and edible gums, and sugar. At least part of the sugar is preferably incorporated at the stage of making the alginate or pectate sol since it aids the dispersion of the sodium alginate or pectate.

The following examples illustrate the invention.

EXAMPLE I

This Example illustrates the application of the invention to the preparation of simulated whole gooseberries. An alginate sol was prepared from the following ingredients:

| | Parts by Weight |
|---|---|
| Sodium alginate (molecular wt about 100,000 mannuronic:guluronic ratio about 1.5:1) | 1.5 |
| Sugar | 8.5 |
| Water | 40.0 |

The sodium alginate and sugar were mixed dry in a powder mixer, and water was added to form an alginate sol in a continuous baffled turbine mixer.

A gooseberry puree mix was prepared by mixing the following ingredients:

|  | Parts by Weight |
| --- | --- |
| Gooseberry puree | 35.0 |
| Sugar | 10.0 |
| Colouring and flavouring agents | 0.5 |
| Water | 4.5 |

The alginate sol and gooseberry puree mix were mixed in equal proportions in a low-residence-time high-shear continuous-in-line mixer (Oakes 4M). The mixture of sol and fruit puree was then extruded into a trough containing a solution having the following composition:

|  | Parts by Weight |
| --- | --- |
| Calcium lactate pentahydrate | 5.0 |
| Sugar | 20.0 |
| Lactic acid | 1.0 |
| Water | 74.0 |

Extrusion was carried out through apertures of diameter 1.6cm, situated below the surface of the calcium lactate solution. On extrusion, a skin of calcium alginate gel formed around each extrudate of sol and fruit puree, and as each extrudate attained a length of 1 - 1.5 cm it was severed at the aperture. In falling through the solution, the cut pieces assumed a rounded shape similar to that of gooseberries, and were deposited on a conveyor belt which carried them along the trough. After 10 minutes the pieces were removed from the calcium lactate solution, the exterior or gel being then thick and strong enough to withstand piling into a container. The pieces were at once put in an aqueous syrup having the following composition:

|  | Parts by Weight |
| --- | --- |
| Sugar | 30.0 |
| Cross-linked starch thickener | 7.0 |
| Malic acid | 0.95 |
| Citric acid | 0.95 |
| Water | 61.1 |

After standing for half an hour, the pieces were heated to 90° C (steam kettle) in the aqueous syrup to prevent the core from becoming a firm gel and canned while still hot. They had a texture very similar to that of canned whole gooseberries.

EXAMPLE II

This Example illustrates the application of the invention to the preparation of simulated whole cherries.

An alginate sol was prepared by the method described in Example I from the following ingredients:

|  | Parts by Weight |
| --- | --- |
| Sodium alginate (mannuronic:guluronic ratio about 0.4:1) | 0.7 |
| Castor sugar | 10.3 |
| Water | 39.0 |

A cherry puree mix was prepared by mixing the following ingredients:

|  | Parts by Weight |
| --- | --- |
| Cherry puree | 38.2 |
| Granulated sugar | 10.6 |
| Precooked potato starch | 1.0 |
| Colouring and flavouring agents | 0.2 |

The alginate sol and cherry puree mix were mixed in equal proportions in an Oakes 4M mixer. The mixture of sol and fruit puree was then extruded into a trough containing a solution having the following composition:

|  | Parts by Weight |
| --- | --- |
| Calcium lactate pentahydrate | 5.0 |
| Sugar | 20.0 |
| Malic acid | 0.5 |
| Water | 74.5 |

Extrusion was carried out through apertures of diameter 1.5 cm situated below the surface of the calcium lactate solution. On extrusion a skin of calcium alginate gel formed around each extrudate of sol and fruit puree and as each extrudate attained a length of 1 - 1.5 cm it was severed at the aperture. In falling through the solution the cut pieces assumed a rounded shape but generally similar to that of cherries and were deposited on a conveyor belt which carried them along the trough. After 20 minutes the pieces were removed from the calcium lactate solution and drained on a wire mesh conveyor. The pieces were at once put in an aqueous syrup having the following composition, the ratio of simulated fruit to syrup being 3:2.

|  | Parts by Weight |
| --- | --- |
| Sugar | 35.0 |
| Cross-linked starch thickener | 7.0 |
| Citric acid | 0.75 |
| Dicalcium phosphate | 0.25 |
| Colouring and flavouring agents | 0.15 |
| Water | 56.85 |

The pieces were heated to 85° C. in the aqueous syrup and held at that temperature for 3 minutes to prevent the core from becoming a firm gel. They were then filled into jars and sealed while still hot. They had a texture very similar to that of canned whole cherries. When the mixture of simulated cherries and thickened syrup was filled into pies and baked the simulated cherries retained their texture.

What we claim is:

1. A process for preparing a fruit product consisting essentially of the steps of
   (a) mixing fruit pulp or purée and an aqueous alginate or pectate sol to form a mixture;
   (b) extruding the mixture to form drops of the mixture;
   (c) treating the drops with an aqueous solution of an edible calcium salt to give the drops a skin of calcium alginate or pectate and a fluid or plastic core; and
   (d) while the drops still have a fluid or plastic core, heating the treated drops to a temperature of 70° C to about 100° C to prevent full gelation of the sol in the interior of the drops said process thereby producing said fruit product with a firm outer skin and a softer interior.

2. A process as claimed in claim 1 whereby in steps (b) and (c) the mixture is extruded below the surface of the aqueous solution of the edible calcium salt.

3. A process as claimed in claim 2 whereby the extruded mixture is cut to form the drops while suspended in the aqueous solution.

4. A process as defined in claim 1 wherein the sol in step (a) is an aqueous alginate sol and wherein the treated drops in step (d) are heated at 85° C or above for at least two minutes.

5. A process as claimed in claim 1 in which the fruit pulp or purée is gooseberry pulp or purée.

6. A process as claimed in claim 5 in which the sol used is an alginate sol with a ratio of mannuronic acid residues to guluronic acid residues greater than 1:1.

7. A process as claimed in claim 1 in which the fruit pulp or purée is cherry pulp or purée.

8. A process as claimed in claim 7 in which the sol used is an alginate sol with a ratio of mannuronic acid residues to guluronic acid residues of less than 1:1.

9. A process for preparing a fruit product consisting essentially of the steps of:
 (a) mixing fruit pulp or purée and an aqueous alginate or pectate sol to form a mixture;
 (b) extruding the mixture to form drops of the mixture;
 (c) treating the drops with an aqueous solution of an edible calcium salt to give the drops a skin of calcium alginate or pectate;
 (d) removing the treated drops from the aqueous solution of the edible calcium salt and putting the treated drops into an aqueous syrup; and
 (e) while the drops still have a fluid or plastic core, heating the treated drops in the aqueous syrup to a temperature of 70° C to about 100° C to prevent full gelation of the sol in the interior of the drops said process thereby producing a fruit product with a firm outer skin and a soft interior.

10. A process as claimed in claim 9 wherein in steps (b) and (c) the mixture is extruded below the surface of the aqueous solution of the edible calcium salt.

11. A process as claimed in claim 10 wherein the extruded mixture while suspended in the aqueous solution is cut to form the drops.

12. A process as claimed in claim 9 wherein the sol in step (a) is an aqueous alginate sol and the treated drops in step (e) are heated at 85° C or above for at least two minutes.

13. A process as claimed in claim 9 wherein the treated drops are heated in the aqueous syrup within one hour of the treated drops being removed from the aqueous solution of the edible calcium salt.

14. A process as claimed in claim 13 wherein the treated drops are heated within 30 minutes of the treated drops being removed from the aqueous solution of the edible calcium salt.

15. A process as claimed in claim 9 in which the drops are treated with the aqueous solution of the edible calcium salt for about 10 to about 30 minutes.

16. A process as claimed in claim 9 wherein the aqueous sugar syrup contains 0.1 to 0.5% by weight of an edible calcium salt.

17. A process as claimed in claim 9 in which the fruit pulp or purée is gooseberry pulp or purée.

18. A process as claimed in claim 17 in which the sol used is an alginate sol with a ratio of mannuronic acid residues to guluronic acid residues greater than 1:1.

19. A process as claimed in claim 9 in which the fruit pulp or purée is cherry pulp or purée.

20. A process as claimed in claim 19 in which the sol used is an alginate sol with a ratio of mannuronic acid residues to guluronic acid residues of less than 1:1.

* * * * *